July 27, 1926.  
J. S. SHEAFE  
HOSE COUPLING  
Filed Jan. 26, 1925
1,593,605
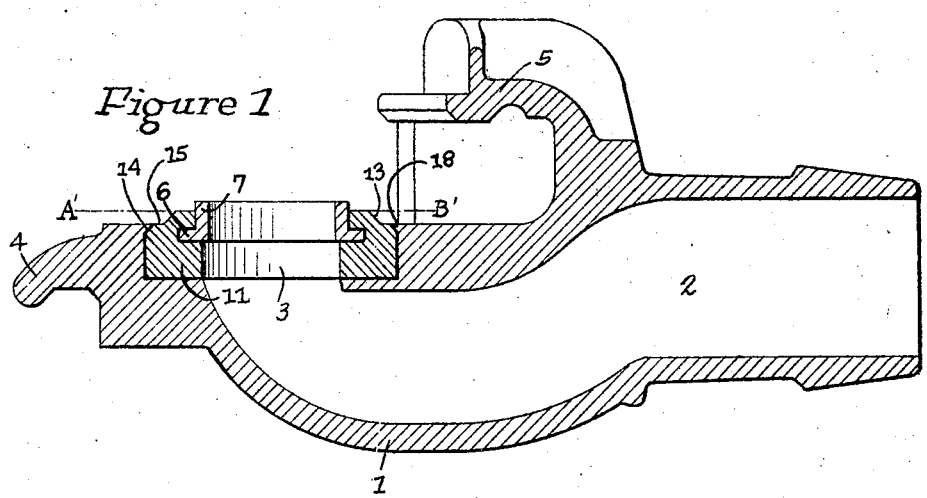
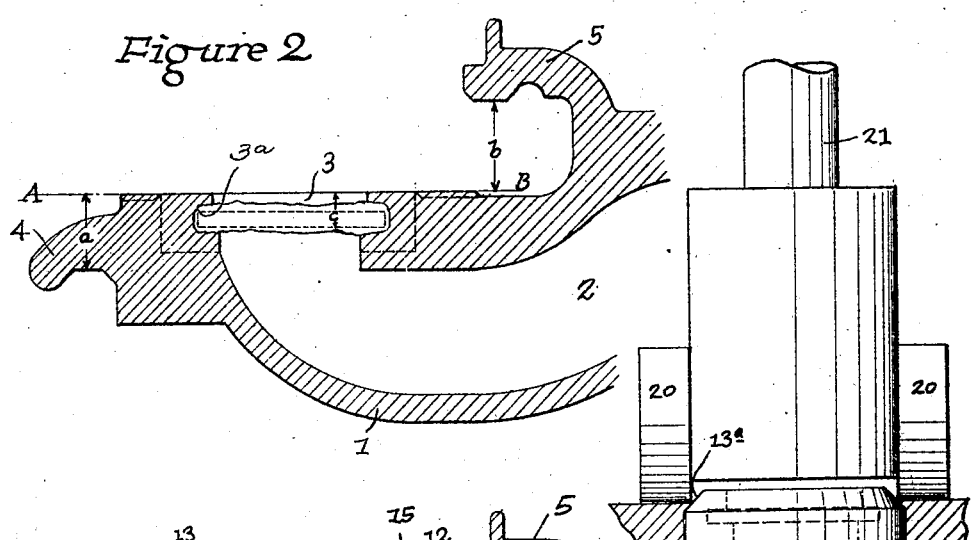
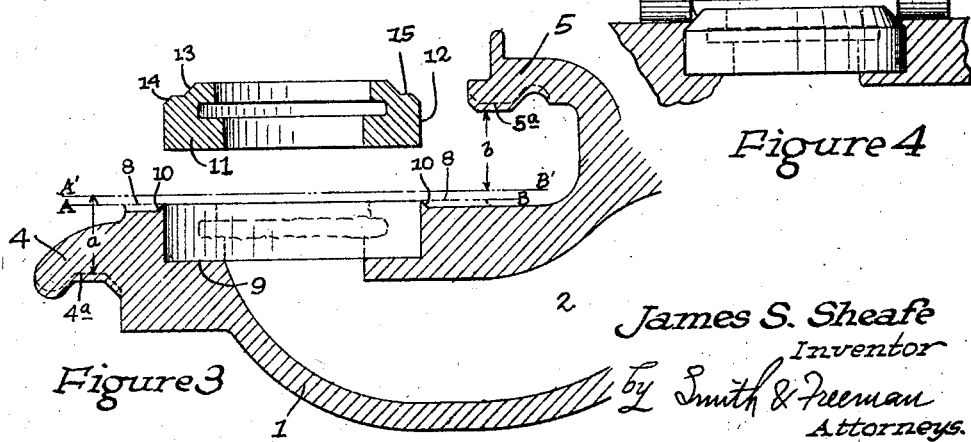
James S. Sheafe  
Inventor  
by Smith & Freeman  
Attorneys.

Patented July 27, 1926.

1,593,605

UNITED STATES PATENT OFFICE.

JAMES S. SHEAFE, OF EVANSTON, ILLINOIS.

HOSE COUPLING.

Application filed January 26, 1925. Serial No. 4,757.

This invention relates to the hose coupling employed for securing together the air brake and signal pipe hose of railway trains and has for its object the provision of an improved coupling which shall be free from corrosion or leakage. A further and important object of the invention is the provision of a new procedure for reclaiming and repairing couplings which have become so worn and corroded in practice as to no longer give proper service; while further objects and advantages of the invention will become apparent as the description proceeds.

In the drawings accompanying and forming a part of this application I have shown wherein Fig. 1 is a longitudinal sectional view through an air hose coupling containing my improvements; Fig. 2 is a similar view through a worn out coupling not containing my improvements; Fig. 3 illustrates the steps of applying or reclaiming such a coupling and Fig. 4 is a detail view showing a slightly modified shape of seat ring.

These couplings consist of malleable iron heads 1 having longitudinal passageways 2 therethrough terminating in ports 3 turned laterally of the general direction of the passageway and held in coupled relation with an adjacent head by means of a pair of complementary flanges 4 and 5 projecting lengthwise of the head engaging the similar flanges of a companion head, one flange, 4, being located at the end of the head and the other, 5, at the side, both being concentric with the port 3. Such couplings, when new, are built around an established base line A—B, indicated in Fig. 2, with its dimensions $a$, $b$ figured from this base line, the dimension $a$ ordinarily being 19/32 of an inch and dimension $b$ 23/32 of an inch. The interior of the port 3 is also formed with a groove $3^a$ adapted for the reception of the base flange 6 of a soft rubber washer 7 adapted to engage a similar washer carried by the mating coupling and prevent leakage of air. As a result of rusting and wear the dimension $a$ gradually decreases, the dimension $b$ gradually increases, and the groove $3^a$ becomes slowly larger in diameter so that where its inner wall was originally spaced from the line A—B a fixed distance $c$, this dimension gradually increases and allows the washer to recede from the opposite coupling as well as permitting escape of air around the flange 6. Leakage of air from train lines is a very serious and expensive occurence in that it renders the braking operation very uncertain and ineffective, particularly at the end of a long freight train. As a result the railroads of the United States are obliged to replace many hundreds of thousands of such couplings annually due merely to variations in dimensions $a$, $b$, and $c$ added to undue corrosion of the groove $3^a$, the couplings being entirely sound in all other respects.

In order to reclaim such a discarded coupling I re-establish a new base line A'—B' as indicated in Fig. 3, this new line being located above the original line A—B. To accomplish this I first remove from the face of the coupling the portions of metal indicated by the dotted lines at 8, and counterbore the mouth of the port as shown at 9, leaving only a narrow rib 10 of the malleable metal immediately surrounding this counterbore. In this counterbore I then introduce a non-corrodible bushing 11. The base of this bushing is flat and annular to rest on the bottom of the counterbore, and its side wall is preferably cylindrical as shown at 12 to fit the side wall of the counterbore but its thickness at the center is substantially greater than the height of the side wall. Its outer face slants from the center to the edges, either in two steps 13 and 14 as shown in Figs. 1 and 3 or in a single bevel as shown at $13^a$ in Fig. 4. At its outer edge this slanting portion meets the side wall of the counterbore below the top of the rib 10. After the bushing has been located in this counterbore the rib 10 is rolled over so as to overlap this slanting portion as indicated at 18 in Fig. 1. This can be done in any one of many modes, even by hand if desired, although in practice I ordinarily employ a couple of small hardened steel rollers 20—20 as shown in Fig. 4, mounted transversely of a rotatable shank 21 which is operated by a machine much like a drill press. Preferably, when the bushing is formed with a flattened portion 15 as shown in Fig. 1 this portion is arranged to lie flush with the mating face of the coupling so as to facilitate the rolling operation. However, it is entirely possible to omit this portion as shown in Fig. 4 and allow the bushing to project directly from the coupling face.

This bushing is so chosen as to project from the face of the coupling at least as far as the original base line A—B and preferably a short distance further, thus enabling the establishment of a new base line A'—B'. By suitable machinery operations, well known to those skilled in the art, for example those used in making new couplings, the face of the ring is cut away, a groove is formed therein for the flanges 4 and 5 recut at the points 4ª and 5ª to correspond with this new base line. It is generally best to do all these things at one time and with a single setting, but I do not limit myself thereto, for the ring can be formed in advance to exactly the right length, the groove can be formed in advance, and the cuts 4ª and 5ª can be made independently and many other detail changes made.

A coupling prepared as heretofore described is superior in all respects to a new all iron coupling. The bushing 11 being of non-corrodible metal, there is no possibility for the gasket groove to become corroded so as to permit leakage of the air or loss of the gasket. Owing to the permanent and unyielding manner in which the bushing is secured to the coupling head, leakage or loss is impossible, even under the hard usage to which devices of this nature are subjected.

It will be understood that I do not limit my invention to employment in connection with reclaiming old couplings nor in any respect of shape, design, or minor details except as specifically recited in the claims hereto annexed.

Having thus described my invention what I claim is:—

1. The method of reclaiming discarded air hose couplings of the type wherein a malleable iron head is formed with flanges adapted to engage the complementary flanges of a mating head to hold the parts together, said flanges projecting approximately parallel with the longitudinal axis of the coupling and said head having a passageway therethrough whose mouth is arranged perpendicular to such longitudinal axis, said method containing the steps of forming the mouth of said passageway with a counterbore, removing sufficient metal from the mating face of said coupling member to define a narrow integral annular flange adjacent to said counterbore, introducing into said counterbore a bushing which is chamfered adjacent to said flange and also has a part of its body extending beyond the plane of said flange, upsetting said flange into engaging relation with said chamfered portion, and recutting the securing flanges to correspond to the new base line defined by the projecting end of said bushing.

2. The method of reclaiming discarded air hose couplings of the type wherein a malleable iron head is formed with flanges adapted to engage the complementary flanges of a mating head to hold the parts together, said flanges projecting approximately parallel with the longitudinal axis of the coupling and said head having a passageway therethrough whose mouth is arranged perpendicular to such longitudinal axis, said method comprising the steps of counterboring said mouth, securing permanently therein a metallic bushing which projects beyond the coupling face, facing said bushing to define a new base line, redressing the first mentioned flanges to correspond with said base line, and forming the interior of said bushing with a grooved spaced a predetermined distance from the said base line and adapted to receive a rubber gasket.

In testimony whereof, I hereunto affix my signature.

JAMES S. SHEAFE